United States Patent Office 3,530,111
Patented Sept. 22, 1970

3,530,111
WATER-INSOLUBLE PHENYL-AZO-PHENYL
DYESTUFFS
Hansjoerg Angliker, Basel, Switzerland, assignor to Ciba
Limited, Basel, Switzerland, a company of Switzerland
No Drawing. Filed Dec. 20, 1966, Ser. No. 603,135
Claims priority, application Switzerland, Dec. 24, 1965,
17,811/65; Oct. 28, 1966, 15,710/66
Int. Cl. C07c $107/06$; C09b $29/24$
U.S. Cl. 260—206
12 Claims

ABSTRACT OF THE DISCLOSURE

Water-insoluble azo dyestuffs of the formula

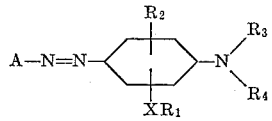

in which A represents the residue of an aromatic or heterocyclic diazo component, X represents an oxygen or a sulphur atom or a direct bond, $R_1$ represents a cycloalkyl, aryl or aralkyl residue, $R_2$ represents a hydrogen atom, an alkyl or alkoxy group or the residue $XR_1$, $R_3$ represents a hydrogen atom or an alkyl group that may be substituted, $R_4$ represents a hydrogen atom or a cyanoalkyl, acyloxyalkyl, carbalkoxyalkyl or cyanoalkoxyalkyl group, at least one of $R_3$ and $R_4$ being other than hydrogen, obtained when a diazo compound of an aromatic or heterocyclic amine is coupled with an amine of the formula

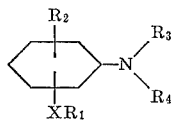

in which X, $R_1$, $R_2$, $R_3$ and $R_4$ are as defined above.

The present invention is based on the observation that valuable water-insoluble azo dyestuffs of the formula

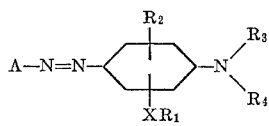

in which A represents the residue of an aromatic or heterocyclic diazo component, X represents an oxygen or a sulphur atom or a direct bond, $R_1$ represents a cycloalkyl, aryl or aralkyl residue, $R_2$ represents a hydrogen atom, an alkyl or alkoxy group or the residue $XR_1$, $R_3$ represents a hydrogen atom or an alkyl group that may be substituted, $R_4$ represents a hydrogen atom or a cyanoalkyl, acyloxyalkyl, carbalkoxyalkyl or cyanoalkoxyalkyl group, and in which either $R_2$ must represent an alkyl, alkoxy or phenoxy group in ortho-position to the amino group or X must represent a sulphur atom or a direct bond when both $R_3$ and $R_4$ represent hydrogen atoms, may be obtained when a diazo compound of an aromatic or heterocyclic amine is coupled with an amine of the formula

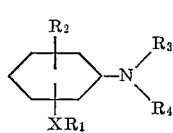

Preferred diazo components are aminobenzenes, especially those of the formula

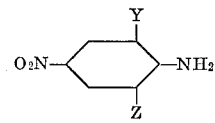

in which Y represents a hydrogen or halogen atom or an alkyl, alkoxy, nitro, cyano, carbalkoxy or alkylsulphone group and Z represents a hydrogen or halogen atom or an alkyl, cyano or trifluoromethyl group.

The following may be mentioned as examples: aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1 - amino - 2,4-dibromobenzene, 1 - amino - 2 - methyl-4-chlorobenzene, 1-amino-2-trifluoromethyl - 4 - chlorobenzene, 1 - amino-2-cyano - 4 - chlorobenzene, 1 - amino - 2-carbomethoxy-4-chlorobenzene, 1-amino-2-carbomethoxy - 4 - nitrobenzene, 1 - amino - 2 - chloro - 4 - cyanobenzene, 1 -amino-2 - chloro - 4 - nitrobenzene, 1 - amino - 2 - chloro-4-carbethoxybenzene, 1-amino - 2 - chloro-4-methylsulphonylbenzene, 1-amino - 2 - methylsulphonyl-4-chlorobenzene, 1 - amino-2-methyl-sulphonyl-4-nitrobenzene, 1-amino-2,4-dinitrobenzene, 1-amino-2,4-dicyanobenzene, 1-amino-2: cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 1-amino-2,4-dinitro-6-chlorobenzene and especially 1-amino-2-cyano-4-nitrobenzene.

The following amines may be mentioned as members of the series of heterocyclic diazo components: 2-aminothiazole, 2-amino-5-cyanothiazole, 2-amino-4-methyl-5-nitrothiazole, 2-amino-4-methylthiazole, 2 - amino - 4-phenylthiazole, 2-amino-4-(4'-chloro)-phenylthiazole, 2-amino-4-(4'-nitro)-phenylthiazole, 2-amino-6-chlorobenzthiazole, 2 - amino - 6 - methylsulphonyl-benzthiazole, 2-amino-6-nitrobenzthiazole, 2-amino-1,3,4-thiadiazole and 2-amino-1,3,5-thiadiazole.

The coupling components to be used in the process of the invention preferably correspond to the formula

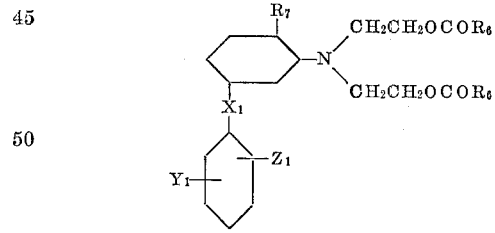

or

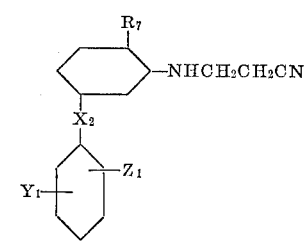

in which $R_6$ represents an alkyl or alkoxy group, $R_7$ represents a hydrogen atom, an alkyl or alkoxy group, $X_1$ represents an oxygen or a sulphur atom or a methylene group, $X_2$ represents an oxygen or a sulphur atom, a methylene group or a direct bond and $Y_1$ and $Z_1$ each represents a hydrogen or halogen atom or an alkyl or alkoxy group.

Likewise of interest are coupling components of the formula

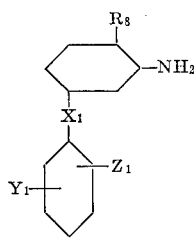

in which $R_8$ represents an alkyl or alkoxy group, and $X_1$, $Y_1$ and $Z_1$ have the meanings given above. The said coupling components may be obtained by known methods, for example, by nitration of para-methoxy-diphenylether and subsequent reduction. Examples are 3-phenoxyaniline, 2-methoxy-5-phenoxyaniline,
2-methyl-5-phenoxyaniline,
N-methyl-2-methoxy-5-phenoxyaniline,
N,N-dimethyl-2-methoxy-5-phenoxyaniline,
N-ethyl-2-methoxy-5-phenoxyaniline,
N,N-diethyl-2-methoxy-5-phenoxyaniline,
N-cyanoethyl-3-phenoxyaniline,
N-cyanoethyl-2-methoxy-5-phenoxyaniline,
N-cyanoethyl-2-ethoxy-5-phenoxyaniline,
N-ethyl-N-cyanoethyl-2-methoxy-5-phenoxyaniline,
N,N-di-cyanoethoxyethyl-2-methoxy-5-phenoxyaniline,
N,N-di-acetoxyethyl-3-phenoxyaniline,
N,N-di-acetoxyethyl-2-methoxy-5-phenoxyaniline,
N-cyanoethyl-N-acetoxyethyl-2-methoxy-5-phenoxyaniline,
N,N-diethyl-5-phenoxyaniline,
N,N-diethyl-2-methyl-5-phenoxyaniline,
N,N-diethyl-2-methoxy-5-(para-chlorophenoxy)-aniline,
N,N-diethyl-2-methoxy-5-(meta-chlorophenoxy)-aniline,
N,N-diethyl-2-methoxy-5-(para-methylphenoxy)-aniline,
N,N-diethyl-2-methoxy-5-(metamethylphenoxy)-aniline,
3-phenylmercaptoaniline,
N,N-diethyl-2-methoxy-5-(metamethylphenoxy)-aniline,
N-cyanoethyl-3-phenylmercapotaniline,
N-ethyl-N-cyanoethyl-2-methoxy-5-phenylmercaptoaniline,
N-cyanoethyl-2-methoxy-5-phenylmercaptoaniline,
N-ethyl-N-acetoxyethyl-2-methoxy-5-phenylmercaptoaniline,
N-cyanoethyl-3-benzylmercaptoaniline,
3-phenylaniline,
2-methoxy-5-phenylaniline,
N-cyanoethyl-3-phenylaniline,
N-cyanoethyl-2-methoxy-5-phenylaniline,
N,N-di-acetoxy-3-phenylaniline,
N,N-di-acetoxy-2-methoxy-5-phenylaniline,
3-benzylaniline,
2-benzyloxyaniline,
N-cynaoethyl-3-benzylaniline,
N-cyanoethyl-2-benzylaniline,
N-cyanoethyl-2-methoxy-5-benzylaniline,
N-β-cyanoethyl-2-benzyloxyaniline,
N,N-di-acetoxy-3-benzylaniline,
N,N-di-acetoxy-2-methoxy-3-benzylaniline,
N-bis-β-acetoxyethyl-3-benzyloxyaniline and
N-β-cyanoethyl-2-phenylaniline.

Diazotization of the diazo components can be carried out by known methods, for example, with the aid of a mineral acid, especially hydrochloric acid, and sodium nitrite, or, for example, with a solution of nitrosyl sulphuric acid in concentrated sulphuric acid.

Coupling can likewise be effected in known manner, for example, in a neutral to acid medium, if necessary, in the presence of sodium acetate or some similar buffer or catalyst which influences the rate of coupling, for example, pyridine or the salts thereof.

Subsequent to the coupling reaction, the dyestuffs formed can easily be isolated from the coupling mixture, for example, by filtration, because they are virtually insoluble in water.

The new dyestuffs are eminently suitable for dyeing and printing materials, especially fibres and fabrics made, for example, from cellulose triacetate and polyamides, but especially from aromatic polyesters. They produce strong dyeings and prints possessing excellent properties of fastness, especially fastness to light, sublimation and rubbing.

For dyeing, the new dyetuffs are advantageously used in a state of fine division and dyeing is carried out in the presence of dispersing agents, for example, soap, sulphite cellulose waste liquor or synthetic detergents, or a combination of different wetting and dispersing agents. Prior to dyeing, it is generally advantageous to convert the dyestuff into a dyeing preparation containing a dispersing agent and the finely divided dyestuff in a form such that a fine dispersion is obtained when the preparation is diluted with water. Dyestuff preparations of this kind may be obtained in known manner, for example, by reprecipitation of the dyestuff from sulphuric acid and grinding the suspension so obtained with sulphite cellulose waste liquor, or, if necessary, by grinding the dyestuff in a highly efficient grinding apparatus in the dry or wet state in the presence or absence of dispersing agent.

In order to produce stronger dyeings on polyethylene terephthalate fibres, it has been found to be advantageous to add a swelling agent to the dyebath, or in particular, to carry out the dyeing process under superatmospheric pressure at a temperature above 100° C., for example, at 120° C. Suitable swelling agents are aromatic carboxylic acids, for example, benzoic or salicylic acid, phenols, for example, ortho- or para-hydroxydiphenyl, aromatic halogenated compounds, for example, chlorobenzene, ortho-dichlorobenzene or trichlorobenzene, phenylmethylcarbinol or diphenyl. When dyeing under superatmospheric pressure, it has been found to be advantageous to render the dyebath slightly acid, for example, by the addition of a weak acid, for example, acetic acid.

By virtue of their fastness to alkali, the new dyestuffs are also suitable for application by the so-called thermofixation process in which the fabric to be dyed is impregnated, preferably at a temperature not exceeding 60° C., with an aqueous dispersion of the dyestuff, which advantageously contains 1 to 50% of urea and a thickening agent, especially sodium alginate, and then squeezed in the usual manner. It is expedient to squeeze the impregnated material so that it retains 50 to 100% of its dry weight of dye-liquor.

To the dyestuff, the material thus impregnated is heated to a temperature above 100° C., for example, to a temperature between 180 and 220° C., advantageously after a drying operation, for example, in a current of warm air.

The above-mentioned thermofixation process is specially suitable for the dyeing of union fabrics made from a mixture of polyester and cellulosic fibres, especially cotton. In this case, in addition to the dyestuffs of the invention, the padding liquor should contain dyestuffs suitable for dyeing cotton, especially vat dyestuffs or reactive dyestuffs, that is to say, dyestuffs which are fixed on cellulosic fibres by formation of a chemical bond, for example, dyestuffs containing a chlorotriazine or chlorodiazine residue. In the last-mentioned case, it has been found to be advantageous to add an agent capable of binding acid to the padding solution, for example, an alkali metal carbonate or phosphate, or an alkali metal borate or perborate, or mixtures thereof. When using vat dyestuffs, the padded fabric has to be treated subsequent to the heat treatment with an aqueous alkaline solution of one of the reducing agents commonly used in vat dyeing. Cotton fibres present in union material are left virtually unstained by the new dyestuffs because of their capacity to reserve cotton.

Because they reserve well on wool, the dyestuffs of the invention are also eminently suitable for dyeing union fabrics made from a mixture of polyester fibres and wool.

The dyeing obtained are advantageously subjected to an after-treatment, for example, by heating with an aqueous solution of a non-ionic detergent.

The dyestuffs of the invention can also be applied by printing processes. In this method of application, a printing paste is used which contains, for example, the finely divided dyestuffs together with the usual printing adjuvants, for example, wetting and thickening agents, if necessary, in admixture with one of the above-mentioned cotton dyestuffs, together with urea and/or an agent capable of binding acid if required.

The following examples illustrate the invention. Unless otherwise stated, the parts and percentages are by weight.

EXAMPLE 1

2.9 parts of 2-chloro-4-nitraniline are suspended in 30 parts of water and 6 parts of concentrated hydrochloric acid are added. After cooling to 0° C., 10 parts of 2 N sodium nitrite solution are added dropwise. Subsequently, the batch is stirred for one hour, the excess nitrite is destroyed and then a solution of 4.5 parts of N-β-cyanoethyl-2-methoxy-5-phenoxyaniline in 100 parts of glacial acetic acid is added, the temperature being kept below 5° C. Finally, the dyestuff is completely precipiated at the same temperature by buffering with 30% sodium hydroxide solution. It dyes polyester fibres red tints possessing an excellent fastness to light and sublimation.

Dyeing prescription 1 part of the dyestuff obtained in the manner described in Example 1 is ground wet with 2 parts of a 50% aqueous solution of the sodium salt of dinaphthylmethane disulphonic acid and dried.

The dyestuff preparation so obtained is mixed with 40 parts of a 10% aqueous solution sodium N-benzyl-μ-heptadecyl-benzimidazol-disulfonate and then 4 parts of a 40% acetic acid solution are added. A dyebath of 4,000 parts is prepared by dilution with water.

100 parts of cleansed polyester fibre material are entered into the dyebath so prepared at 50° C., the temperature is then raised to 120 to 130° C. in half an hour, and dyeing is carried out for one hour at that temperature in a closed vessel. The material is then well rinsed. A strong red dyeing possessing an excellent fastness to light and sublimation is obtained.

EXAMPLE 2

A dyestuff which dyes polyester fibres orange tints possessing an excellent fastness to light and to sublimation is obtained when the 4.5 parts of N-β-cyanoethyl-2-methoxy-5-phenoxyaniline used in Example 1 are replaced by 4 parts of N-β-cyanoethyl-3-phenoxyaniline.

EXAMPLE 3

2.7 parts of 2-cyano-4-nitraniline are added in portions to 23 parts of monohydrate in which 1.15 parts of sodium nitrite have been dissolved. The excess nitrite is destroyed and the diazo solution is added dropwise at a temperature not exceeding 10° C. to a solution of 4.5 parts of N-β-cyanoethyl-2-methoxy-5-phenoxyaniline in 100 parts of 80% acetic acid. After stirring for a short time, the dyestuff is completely precipitated at the same temperature by buffering with 30% sodium hydroxide solution. It dyes polyester fibres ruby tints possessing an excellent fastness to light and sublimation.

EXAMPLE 4

A dyestuff which dyes polyester fibres red tints possessing an excellent fastness to light and sublimation is obtained by replacing the 4.5 parts of N-β-cyanoethyl-2-methoxy-5-phenoxyaniline used in Example 3 with 4.2 parts of N-β-cyanoethyl-2-methyl-5-phenoxyaniline.

The following table lists further components from which dyestuffs may be obtained when the diazo components indicated in column I are coupled with the coupling components shown in column II. The tints produced on polyester fibres are indicated in column III.

| | I | II | III |
|---|---|---|---|
| 1 | 2-cyano-4-nitroaniline | N-bis-β-acetoxyethyl-2-methoxy-5-phenoxyaniline | Violet. |
| 2 | do | N-bis-(cyanoethoxyethyl)-2-methoxy-5-phenoxyaniline | Ruby. |
| 3 | do | N-β-cyanoethyl-N-β-acetoxyethyl-2-methoxy-5-phenoxyaniline | Claret. |
| 4 | do | N-β-cyanoethyl-3-phenoxyaniline | Red. |
| 5 | do | N-bis-β-acetoxyethyl-3-phenoxyaniline | Claret. |
| 6 | do | N-β-cyanoethyl-3-(paramethylphenoxy)-aniline | Red. |
| 7 | do | N-β-cyanoethyl-3-'orthochlorophenoxy)-aniline | Red. |
| 8 | do | N-bis-β-acetoxyethyl-2-methoxy-5-phenylmercaptoaniline | Violet. |
| 9 | do | N-β-cyanoethyl-2-methoxy-5-(para-methylphenoxy)-aniline | Claret. |
| 10 | do | N-β-cyanoethyl-2-phenoxyaniline | Red. |
| 11 | do | N-β-cyanoethyl-2-methox y-5-phenylaniline | Claret. |
| 12 | do | N-β-carbethoxyethyl-2-methoxy-5-phenoxyaniline | Violet. |
| 13 | do | N-β-acetoxyethyl-2-methoxy-5-phenoxyaniline | Do. |
| 14 | do | di-N-ethylcarbamic acid ester of N-bis-β-hydroxyethyl-2-methoxy-5-phenoxyaniline. | Do. |
| 15 | do | N-β-cyanoethyl-2-benzylaniline | Scarlet. |
| 16 | do | N-bis-β-acetoxyethyl-3-benzylaniline | Ruby. |
| 17 | do | N-β-cyanoethyl-2-benzyloxyaniline | Red. |
| 18 | do | N-bis-γ-acetoxy-propyl-2-methoxy-5-phenoxyaniline | Violet. |
| 19 | 2,6-dichloro-4-nitraniline | N-β-cyanoethyl-2-methoxy-5-phenoxyaniline | Brown. |
| 20 | do | N-β-cyanoethyl-3-phenoxyaniline | Orange. |
| 21 | 2-cyano-4-nitro-6-bromaniline | N-bis-β-acetoxyethyl-2-methoxy-5-phenoxyaniline | Violet. |
| 22 | do | N-β-cyanoethyl-2-methoxy-5-phenoxyaniline | Do. |
| 23 | do | N-β-cyanoethyl-3-phenoxyaniline | Reddish brown. |
| 24 | 2-cyano-4-nitro-6-chloraniline | N-β-cyanoethyl-2-methoxy-5-phenoxyaniline | Violet. |
| 25 | 2-methylsulphonyl-4-nitraniline | do | Ruby. |
| 26 | 2-cyano-4-nitroaniline | N-β-cyanoethyl-2,5-diphenoxyaniline | Do. |
| 27 | do | di-Propionic acid ester of N-bis-β-hydroxyethyl-2-methoxy-5-phenoxyaniline | Violet. |
| 28 | 2-amino-6-methylsulphonyl-benzthiazole | N-β-cyanoethyl-2-methoxy-5-phenoxyaniline | Red. |
| 29 | 2-cyano-4-nitroaniline | N-β-cyanoethyl-3-benzylmercaptoaniline | Red. |
| 30 | do | N-β-cyanethyl-2-methoxy-5-cyclohexylaniline | Violet. |
| 31 | do | N-bis-β-acetoxyethyl-2-methoxy-5-cyclohexylaniline | Do. |

EXAMPLE 5

2.7 parts of 2-cyano-4-nitraniline are introduced in portions into 23 parts of monohydrate in which 1.15 parts of sodium nitrite have been dissolved. The excess nitrite is destroyed and the diazo component is added dropwise to a solution of 3.9 parts of 4'-methyl-3-amino-4-methoxy-diphenyl-ether in 200 parts of 80% acetic acid, the temperature being kept at between 0 and 10° C. The pH value is kept at about 4 by the simultaneous addition of 30% NaOH. After coupling, the dyestuff is isolated by filtration, washed with water and dried in vacuo. It dyes polyester fibres violet tints.

The following table lists further components from which dyestuffs may be obtained when the diazo components listed in column I are coupled with the coupling components indicated in column II. The tint produced on polyestered fibres is shown in column III.

| | I | II | III |
|---|---|---|---|
| 1 | 2-cyano-4-nitroaniline | 2-methoxy-5-phenoxyaniline | Ruby. |
| 2 | do | 2-methoxy-5-phenylaniline | Violet. |
| 3 | do | 2-methyl-5-phenoxyaniline | Red. |
| 4 | do | 2-methoxy-5-phenylmercaptoaniline | Claret. |
| 5 | 2,6-dichloro-4-nitraniline | 2-methoxy-5-phenoxyaniline | Brown. |
| 6 | 2-cyano-4-nitro-6-chloraniline | do | Violet. |
| 7 | do | 2-methyl-5-phenoxyaniline | Ruby. |
| 8 | 2-cyano-4-nitro-6-bromaniline | do | Do. |
| 9 | do | 2-methoxy-5-phenoxyaniline | Violet. |
| 10 | do | 4'-methyl-3-amino-4-methoxydiphenylether | Do. |
| 11 | do | 2-methoxy-5-phenylaniline | Do. |
| 12 | 2-chloro-4-nitroaniline | 2-methoxy-5-phenoxyaniline | Red. |
| 13 | 4-nitro-2-methyl-sulphonylaniline | do | Ruby. |

What is claimed is:
1. A water-insoluble dyestuff of the formula

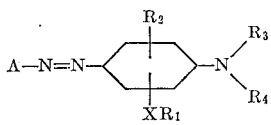

in which A is a benzene component; X is selected from the group consisting of oxygen, sulfur, methylene and a direct bond; $R_1$ is selected from the group consisting of cyclohexyl, aryl and aralkyl containing up to 7 carbon atoms; $R_2$ is selected from the group consisting of hydrogen, alkyl containing up to 2 carbon atoms, alkoxy containing up to 2 carbon atoms and phenoxy; $R_3$ and $R_4$ each are selected from the group consisting of hydrogen, cyanoethyl, acetoxyethyl, carboalkoxyalkyl containing up to 5 carbon atoms and β-cyanoethyloxyethyl, at least one of $R_3$ and $R_4$ being other than hydrogen.

2. A water-insoluble azo dyestuff as claimed in claim 1 of the formula

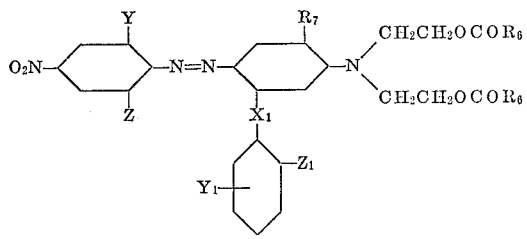

in which Y is selected from the group consisting of hydrogen, chloro, bromo, alkyl, alkoxy, nitro, cyano, carbalkoxy and alkylsulphonyl; Z is selected from the group consisting of hydrogen, chloro, bromo, alkyl, cyano and trifluoromethyl; $R_6$ is selected from the group consisting of alkyl and alkoxy; $R_7$ is selected from the group consisting of hydrogen, alkyl and alkoxy; $Y_1$ is selected from the group consisting of hydrogen, chloro and bromo; $Z_1$ is selected from the group consisting of hydrogen, chloro, bromo, methyl and methoxy; and $X_1$ oxygen, sulphur and methylene, each of said alkyl or alkoxy groups having 1 to 2 carbon atoms.

3. A water-insoluble azo dyestuff as claimed in claim 2 in which $X_1$ represents an oxygen atom.

4. A water-insoluble azo dyestuff as claimed in claim 1 of the formula

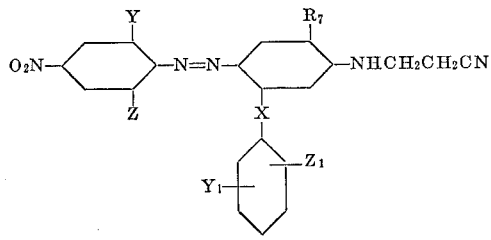

in which X represents an oxygen or a sulphur atom, a methylene group or a direct bond and $R_7$ represents a hydrogen atom or an alkyl or alkoxy group, Y represents a hydrogen or chloro or bromo atom or an alkyl, alkoxy, nitro, cyano, carbalkoxy or alkylsulphonyl group, Z represents a hydrogen or chloro or bromo atom or an alkyl, cyano or trifluoromethyl group, $Y_1$ represents a hydrogen or chloro or bromo atom and $Z_1$ represents a hydrogen or chloro or bromo atom or a methyl or methoxy group, each of said alkyl or alkoxy groups having 1 to 2 carbon atoms.

5. A water-insoluble azo dyestuff as claimed in claim 4, in which X represents an oxygen atom.

6. The dyestuff of claim 1, wherein $R_3$ and $R_4$ each are selected from the group consisting of cyanoethyl, acetoxyethyl, carbalkoxyalkyl containing up to 5 carbon atoms and β-cyanoethyloxyethyl.

7. A water-insoluble azo dyestuff as claimed in claim 1, of the formula

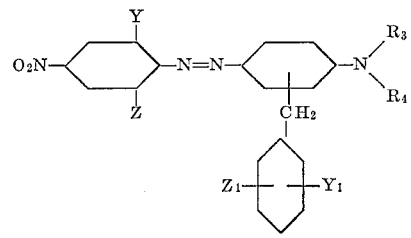

in which Y is selected from the group consisting of hydrogen, chloro, bromo, alkyl, alkoxy, nitro, cyano, carbalkoxy and alkylsulphonyl; Z is selected from the group consisting of hydrogen, chloro, bromo, alkyl, cyano and trifluoromethyl; $Y_1$ is selected from the group consisting of hydrogen, chloro and bromo; $Z_1$ is selected from the group consisting of hydrogen, chloro, bromo, methyl and methoxy; $R_3$ is selected from the group consisting of hydrogen, cyanoethyl and —$CH_2$—$CH_2$—$OCOR_6$; $R_4$ is hydrogen when $R_3$ is cyanoethyl, cyanoethyl when $R_3$ is hydrogen and —$CH_2$—$CH_2$—$OCOR_6$ when $R_3$ is —$CH_2$—$CH_2$—$OCOR_6$; and $R_6$ is selected from the group consisting of alkyl and alkoxy, each of said alkyl or alkoxy groups having 1 to 2 carbon atoms.

8. The dyestuff as claimed in claim 1 of the formula

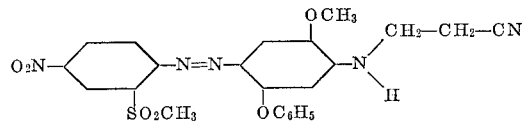

9. The dyestuff as claimed in claim 1 of the formula

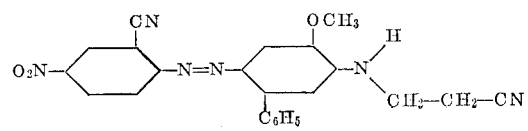

10. The dyestuff as claimed in claim 1 of the formula

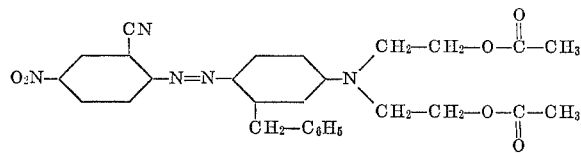

11. The dystuff as calimed in claim 1 of the formula

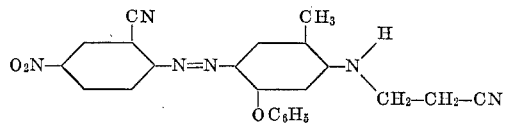

12. The dyestuff as claimed in claim 1 of the formula

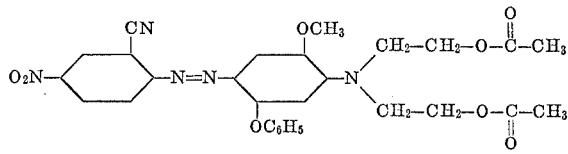

References Cited

UNITED STATES PATENTS

| | | | |
|---|---|---|---|
| 2,153,018 | 4/1939 | Heyna et al. | 260—205 X |
| 2,191,040 | 2/1940 | McNally et al. | 260—206 X |
| 2,204,607 | 6/1940 | McNally et al. | 260—206 |
| 2,216,446 | 10/1940 | McNally et al. | 260—205 X |
| 3,081,295 | 3/1963 | Sterling | 260—205 |
| 3,280,101 | 10/1966 | Straley et al. | 260—158 |

FOREIGN PATENTS 363,108    8/1962    Switzerland.

CHARLES B. PARKER, Primary Examiner

C. F. WARREN, Assistant Examiner

U.S. Cl. X.R.

8—41. 50; 260—158, 205, 207, 207.1.

UNITED STATES PATENT OFFICE
CERTIFICATE OF CORRECTION

PO-1050 (5/69)

Patent No. 3,530,111    Dated September 22, 1970

Inventor(s) Hansjoerg Angliker

It is certified that error appears in the above-identified patent and that said Letters Patent are hereby corrected as shown below:

Column 7, claim 2, the lower portion of the formula should read ---

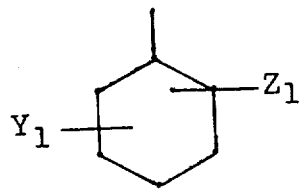

Signed and sealed this 6th day of July 1971.

(SEAL)
Attest:

EDWARD M. FLETCHER, JR.
Attesting Officer

WILLIAM E. SCHUYLER, JR.
Commissioner of Patents